(12) United States Patent
Ishikawa et al.

(10) Patent No.: US 8,953,223 B2
(45) Date of Patent: Feb. 10, 2015

(54) IMAGE PROCESSING APPARATUS FOR PROCESSING MULTI-VALUES IMAGE DATA CORRESPONDING TO A PREDETERMINED AREA OF A RECORDING MEDIUM

(75) Inventors: Tomokazu Ishikawa, Kawasaki (JP); Akitoshi Yamada, Yokohama (JP); Mitsuhiro Ono, Tokyo (JP); Rie Kajihara, Minoo (JP); Yuji Konno, Kawasaki (JP); Yutaka Kano, Yokohama (JP); Hitoshi Nishikori, Inagi (JP); Norihiro Kawatoko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 12/905,529

(22) Filed: Oct. 15, 2010

(65) Prior Publication Data

US 2011/0090538 A1    Apr. 21, 2011

(30) Foreign Application Priority Data

Oct. 19, 2009    (JP) ................. 2009-240870

(51) Int. Cl.
*H04N 1/405*    (2006.01)
*G06K 15/10*    (2006.01)

(52) U.S. Cl.
CPC .............. *G06K 15/107* (2013.01); *H04N 1/405* (2013.01)
USPC ....................................... 358/3.14; 358/3.21

(58) Field of Classification Search
None
See application file for complete search history.

(56) References Cited

U.S. PATENT DOCUMENTS

| 4,958,236 A * | 9/1990 | Nagashima et al. .......... 358/445 |
| 6,511,143 B1 | 1/2003 | Ishikawa et al. |
| 2009/0161165 A1 * | 6/2009 | Fujimoto et al. ............... 358/2.1 |

FOREIGN PATENT DOCUMENTS

JP    2000-103088 A    4/2000

* cited by examiner

*Primary Examiner* — Barbara Reinier
*Assistant Examiner* — Christopher D Wait
(74) *Attorney, Agent, or Firm* — Canon U.S.A., Inc. IP Division

(57) ABSTRACT

Multi-valued image data corresponding to a pixel area is divided into the first scanning multi-valued data, first and second scanning common multi-valued data, and second scanning multi-valued data. A quantization processing is executed on each of the multi-valued data to generate first scanning quantized data, first and second scanning common quantized data, and second scanning quantized data. After that, these pieces of quantized data are combined for each scanning to generate first scanning combined quantized data and second scanning combined quantized data. According to this, the amount of pixels where dots are both recorded by performing a scanning by plural times (the amount of overlapping dots) is controlled, and while suppressing the image density variations, the granularity is held to a low level.

21 Claims, 10 Drawing Sheets

MAIN SCANNING DIRECTION

FIG. 6A

|   | ● | 7 |
|---|---|---|
| 1 | 3 | 5 |

● REPRESENTS FOCUS PIXEL

FIG. 6B

|   | ● | 9 | 3 |
|---|---|---|---|
| 5 | 9 | 3 |   |
|   | 3 |   |   |

● REPRESENTS FOCUS PIXEL

FIG. 6C

|   |   | ● | 2 | 1 |
|---|---|---|---|---|
| 1 | 1 | 2 | 1 |   |

● REPRESENTS FOCUS PIXEL

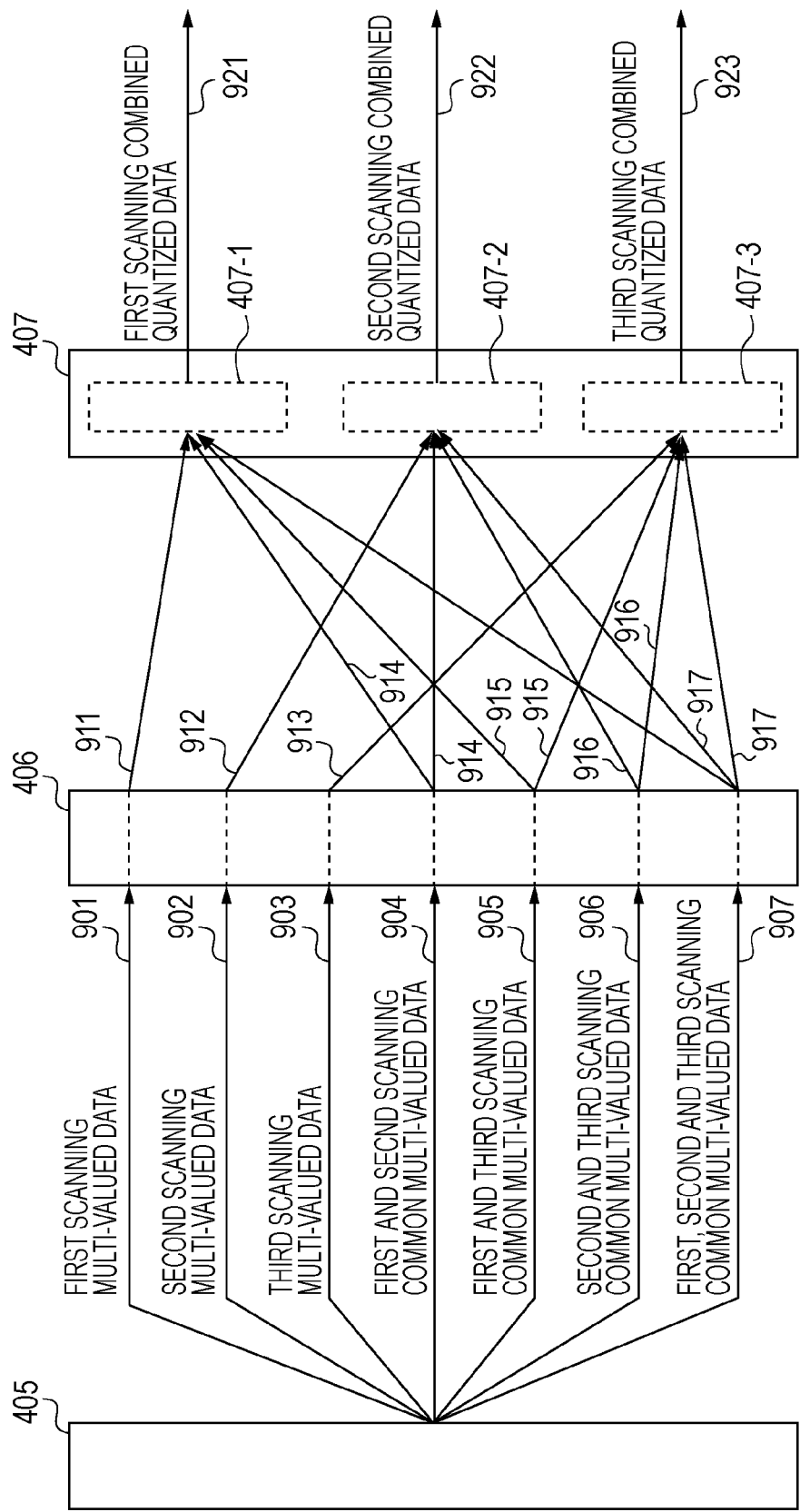

IMAGE PROCESSING APPARATUS FOR PROCESSING MULTI-VALUES IMAGE DATA CORRESPONDING TO A PREDETERMINED AREA OF A RECORDING MEDIUM

BACKGROUND OF THE INVENTION

1. Field of the Invention

The present invention relates to an image processing apparatus and an image processing method of processing multi-valued image data corresponding to a predetermined area of a recording medium for recording an image in the predetermined area through a relative movement of the recording medium and a recording head.

2. Description of the Related Art

As a technology for suppressing density fluctuations and streaks of an image recorded in an inkjet recording apparatus, a multi-pass recording system is proposed for performing a recording scanning by a recording head by plural times with respect to a same area of a recording medium and completing an image that should be recorded on the above-mentioned same area. However, even when the multi-pass recording system is adopted, due to variations in a conveyance amount of the recording medium or the like, a shift may be generated between a dot recording position for a preceding recording scanning and a dot recording position for a succeeding recording scanning in some cases. Such a shift leads to variations in a dot coverage, and because of this, image adverse effects such as density variations and density fluctuations are generated.

As a technology for suppressing such image adverse effects, Japanese Patent Laid-Open No. 2000-103088 discloses a method of dividing image data so as to correspond to different recording scannings in a stage of multi-valued image data before binarization and independently binarizing each of the multi-valued image data after the division (in an uncorrelated manner). FIG. 10A shows an arrangement state of dots recorded on the basis of the image data processed through the method according to Japanese Patent Laid-Open No. 2000-103088. In the drawing, black circles 551 represents dots recorded by a first recording scanning, white circles 552 represents dots recorded by a second recording scanning, and gray circles 553 represents dots overlapped and recorded by the first recording scanning and the second recording scanning.

According to such a dot arrangement, even when the dot group recorded by the first recording scanning and the dot group recorded by the second recording scanning are shifted in a main scanning direction or a sub scanning direction, the coverage of the dots with respect to the recording medium do not vary so much. This is because parts where the dots recorded by the first recording scanning and the dots recorded by the second recording scanning are overlapped with each other also newly appear, but parts where two dots that should be originally overlapped and recorded are not overlapped with each other also exist.

However, according to the method disclosed in Japanese Patent Laid-Open No. 2000-103088, as the multi-valued data corresponding to the different recording scannings is quantized in an uncorrelated manner, the overlapping amount of mutual dots recorded by the different recording scannings cannot be controlled. Therefore, in some cases, the number of overlapping dots is excessive and a granularity of the image is deteriorated, and conversely, the number of overlapping dots is too small and the above-mentioned density variations cannot be sufficiently suppressed.

SUMMARY OF THE INVENTION

The present invention has been made in view of the above-mentioned problems and provides an image processing apparatus and an image processing with which it is possible to hold the granularity to a low level while suppressing the above-mentioned density variations.

According to an embodiment of the present invention, there is provided an image processing apparatus for processing multi-valued image data corresponding to an image that is to be recorded in a pixel area of a recording medium to record the image in the pixel area by performing a relative scanning of a recording head and the recording medium by at least two times, the image processing apparatus including: a division unit configured to divide the multi-valued image data into first multi-valued data corresponding to a first relative scanning, second multi-valued data corresponding to a second relative scanning, and third multi-valued data corresponding commonly to the first relative scanning and the second relative scanning; a quantization unit configured to execute a quantization processing on each of the first, second, and third multi-valued data to generate first, second, and third quantized data; and a combination unit configured to combine the first quantized data and the third quantized data to generate combined quantized data corresponding to the first relative scanning and also combine the second quantized data and the third quantized data to generate combined quantized data corresponding to the second relative scanning.

According to another embodiment of the present invention, there is provided an image processing apparatus for processing multi-valued image data corresponding to an image that is to be recorded in a pixel area of a recording medium to record the image in the pixel area by performing a relative scanning of first and second recording element groups and the recording medium, the image processing apparatus including: a division unit configured to divide the multi-valued image data into first multi-valued data corresponding to the first recording element group, second multi-valued data corresponding to the second recording element group, and third multi-valued data corresponding commonly to the first recording element group and the second recording element group; a quantization unit configured to execute a quantization processing on each of the first, second, and third multi-valued data to generate first, second, and third quantized data; and a combination unit configured to combine the first quantized data and the third quantized data to generate combined quantized data corresponding to the first recording element group and also combine the second quantized data and the third quantized data to generate combined quantized data corresponding to the second recording element group.

According to another embodiment of the present invention, there is provided an image processing apparatus for processing multi-valued image data corresponding to an image that is to be recorded in a pixel area of a recording medium to record the image in the pixel area by performing a relative scanning of a recording head and the recording medium by plural times, the image processing apparatus including: a division unit configured to divide the multi-valued image data into multi-valued data corresponding to each of the plural relative scannings and multi-valued data corresponding commonly to at least two relative scannings among the plural relative scannings; a quantization unit configured to execute a quantization processing on each of the multi-valued data generated by the division unit to generate quantized data corresponding to each of the plural relative scannings and quantized data corresponding to the at least two relative scannings; and a combination unit configured to combine the quantized data generated by the quantization unit for each corresponding relative scanning to generate combined quantized data corresponding to each of the plural relative scannings.

According to another embodiment of the present invention, there is provided an image processing method of processing multi-valued image data corresponding to an image that is to be recorded in a pixel area of a recording medium to record the image in the pixel area by performing a relative scanning of a recording head and the recording medium by at least two times, the image processing method including: dividing the multi-valued image data into first multi-valued data corresponding to a first relative scanning, second multi-valued data corresponding to a second relative scanning, and third multi-valued data corresponding commonly to the first relative scanning and the second relative scanning; executing a quantization processing on each of the first, second, and third multi-valued data to generate first, second, and third quantized data; and combining the first quantized data and the third quantized data to generate combined quantized data corresponding to the first relative scanning and also combining the second quantized data and the third quantized data to generate combined quantized data corresponding to the second relative scanning.

According to another embodiment of the present invention, there is provided an image processing method of processing multi-valued image data corresponding to an image that is to be recorded in a pixel area of a recording medium to record the image in the pixel area by performing a relative scanning of a recording head and the recording medium by plural times, the image processing method including: a first step of dividing the multi-valued image data to generate multi-valued data corresponding to each of the plural relative scannings and multi-valued data corresponding commonly to at least two relative scannings among the plural relative scannings; a second step of executing a quantization processing on each of the multi-valued data generated in the first step to generate quantized data corresponding to each of the plural relative scannings and quantized data corresponding to the at least two relative scannings; and a third step of combining the quantized data generated in the second step for each corresponding relative scanning to generate combined quantized data corresponding to each of the plural relative scannings.

According to the embodiments of the present invention, it is possible to control the amount of dots recorded by performing a scanning by plural times or by using a plurality of recording element groups (the amount of overlapping dots). According to this, it is possible to hold the granularity to a low level while suppressing the image density variations.

Further features of the present invention will become apparent from the following description of exemplary embodiments with reference to the attached drawings.

BRIEF DESCRIPTION OF THE DRAWINGS

FIGS. 6A to 6C show error distribution matrices representing error distribution coefficients with respect to surrounding pixels at the time of performing an error diffusion processing.

FIG. 9 is a block diagram showing schematic configuration for carrying out a generation processing (image processing) of recording data for performing a three-pass recording.

DESCRIPTION OF THE EMBODIMENTS

An inkjet recording apparatus is exemplified in embodiments which will be described below, but the present invention is not limited to the inkjet recording apparatus. An apparatus other than the inkjet recording apparatus can also be applied as long as the apparatus adopts a method of recording an image on a recording medium by a recording unit during a relative scanning of a recording head for recording dots and the recording medium.

Figure 2:
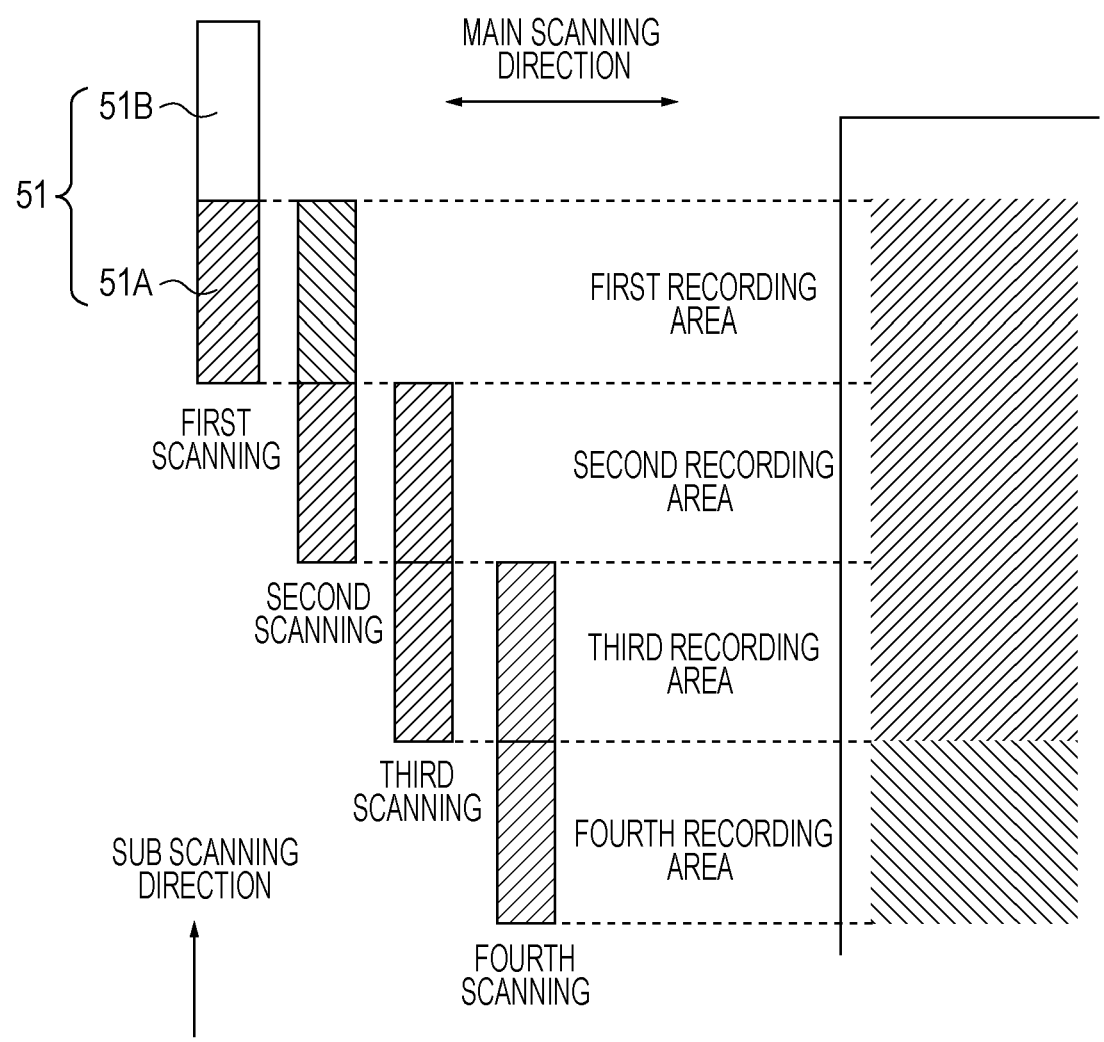
FIG. 2 is an explanatory diagram for describing a multi-pass recording by using two passes.

In the present specification, the "multi-pass recording" refers to a recording system for completing an image that should be recorded in a same area of a recording medium through a relative scanning (relative movement) of a recording head and the recording medium. The "relative scanning (relative movement) of the recording head and the recording medium" refers to an operation for the recording head to relatively move (scan) with respect to the recording medium or an operation for the recording medium to relatively move (to be relatively conveyed) with respect to the recording head. The "same area" refers to "one pixel area" in a micro sense and refers to a "recordable area through the single relative scanning" in a macro sense. The "pixel area (which may also be simply referred to as "pixel" in some cases)" refers to an area in the smallest unit where a gradation can be represented by multi-valued image data. On the other hand, the "recordable area through the single relative scanning" refers to an area on the recording medium where the recording head passes during the single relative scanning or an area smaller than this area (for example, one raster area). For example, in a serial-type recording apparatus, in a case where a multi-pass mode of M passes as shown in FIG. 2 (M is an integer equal to or larger than 2) is executed, one recording area in the drawing (area having a width which is 1/M of a nozzle array width) can also be defined as the same area in a macro sense.

Figure 1A:
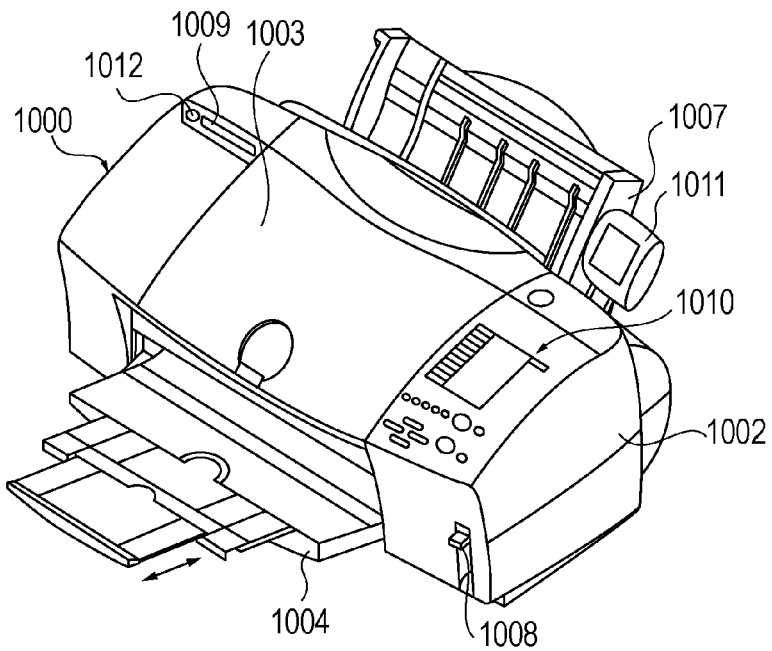
FIGS. 1A to 1C are schematic configuration diagram of a printer functioning as an image processing apparatus according to an embodiment of the present invention.

It should be noted that hereinafter, the "relative scanning" is simply referred to as "scanning". For example, in a case of a multi-pass recording using three passes, the relative scanning is performed on one pixel area by three times (a first relative scanning, a second relative scanning, and a third relative scanning), and these first to third relative scannings are respectively referred to as "first scanning", "second scanning", and "third scanning". Schematic configuration of recording apparatus FIG. 1A is a birds-eye perspective view of a photo direct printer apparatus (hereinafter, PD printer) 1000 which is applicable as an image processing apparatus according to an embodiment of the present invention. The PD printer 1000 has a function of receiving date from a host computer (PC) for printing, a function of directly reading an image stored in a storage medium such as a memory card for printing, and a function of receiving an image from a digital still camera, a PDA, or the like for printing.

In FIG. 1A, a sheet output tray 1004 can take in recorded sheets. A user can open and close an access cover 1003 for replacing a recording head cartridge, an ink tank, or the like which is accommodated in a main body of the apparatus. On an operation panel 1010 provided on a top case 1002, menu items for various settings on conditions related to printing (for example, a type of the recording medium, an image quality, and the like) are displayed, and the user can set these items in accordance with a type and a use of an image to be output. An automatic feeding unit 1007 automatically feeds the recording medium into the main body of the apparatus. To a card slot 1009, an adapter to which the memory card can be mounted is inserted. A USB terminal 1012 is used for connecting the digital still camera. On a rear face of the PD printer 1000, a USB connector for connecting a PC is provided.

Figure 1B:
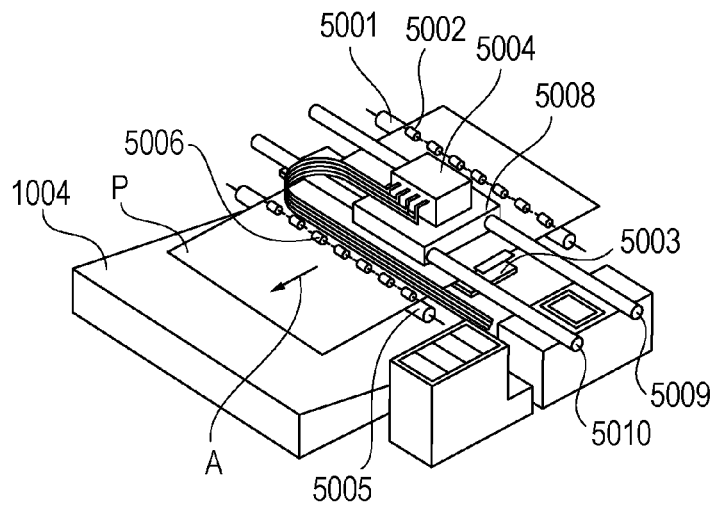

FIG. 1B is a perspective view showing an outline of an internal configuration of the PD printer. A recording medium P is fed by the automatic feeding unit 1007 to a nip portion formed by a conveyance roller 5001 arranged on a conveyance path and a driven pinch roller 5002. After that, by rotation of the conveyance roller 5001, while being guided and supported on a platen 5003, the recording medium P is conveyed in an arrow A direction in the drawing (sub scanning direction). The pinch roller 5002 is resiliently biased against the conveyance roller 5001 by a press unit such as a spring which is not shown in the drawing. The conveyance roller 5001 and the pinch roller 5002 constitute components of a first conveyance unit located on an upstream side in a recording medium conveyance direction.

The platen 5003 is arranged at a recording position opposing a face where an ejection orifice of an inkjet-type recording head 5004 is formed (ejection face) and supports a rear surface of the recording medium P so that a distance between a front surface of the recording medium P and the ejection face is maintained to a certain distance. The recording medium P conveyed on the platen 5003 on which the recording is performed is sandwiched between a rotating discharge roller 5005 and a driven spur 5006 functioning as a rotator to be conveyed in the A direction and discharged from the platen 5003 to the sheet output tray 1004. The discharge roller 5005 and the spur 5006 constitute components of a second conveyance unit located on a downstream side in the recording medium conveyance direction.

The recording head 5004 is mounted to be detachably attached to a carriage 5008 in an orientation where the ejection orifice face thereof is opposed to the platen 5003 and the recording medium P. The carriage 5008 reciprocates along two guide rails 5009 and 5010 by a driving force of a carriage motor E0001, and in the course of the movement, the recording head 5004 executes an ink ejection operation in accordance with a recoding signal. A direction in which the carriage 5008 is moved is a direction (main scanning direction) which is intersected with the direction in which the recording medium is conveyed (arrow A direction). As the main scanning by the carriage 5008 and the recording head 5004 (movement involving the recording) and the conveyance of the recording medium (sub scanning) are alternately repeatedly performed, the recording is carried out on the recording medium P.

Figure 1C:
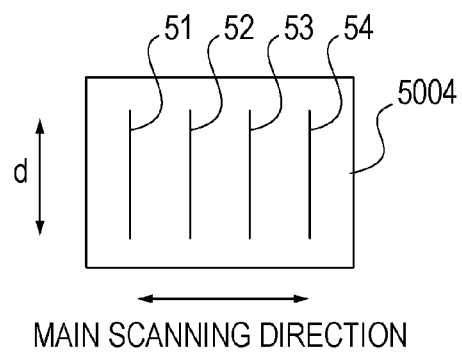

FIG. 1C is a schematic diagram in a case where the recording head 5004 is observed from an ejection orifice formation face. In the drawing, denoted by 51 is a cyan nozzle alley, 52 is a magenta nozzle alley, 53 is a yellow nozzle alley, and 54 is a black nozzle alley. A width of each nozzle array in the sub scanning direction is denoted by d, and the recording of the width d can be realized through the single scanning.

Each of the nozzle alleys 51 to 54 is constructed by 1200 nozzles disposed in the sub scanning direction at 600 dpi (dot/inch), that is, at an interval of approximately 42 μm. Each of the nozzles is provided with the ejection orifice, an ink path for guiding ink to the ejection orifice, and an electrothermal transducer for generating film boiling in the ink in the vicinity of the ejection orifice. Under such a configuration, by applying a voltage pulse to the individual electrothermal transducers in accordance with an ejection signal, the film boiling is generated in the ink in the vicinity of the electrothermal transducer, and the ink at an amount corresponding to a growth of a generated bubble is ejected as a droplet from the ejection orifice.

Multi-Pass Recording

As the recording apparatus according to the present embodiment can execute the multi-pass recording, in the recordable area by the single recording scanning by the recording head 5004, the image is formed stepwise by performing the recording scanning by plural times. Between the respective recording scannings, by performing a conveyance operation at an amount smaller than the width d of the recording head 5004, it is possible to suppress density fluctuations and streaks caused by variations of the individual nozzles. Whether the multi-pass recording is performed or which number of the multi-passes is used (by which number of times the recording scanning is performed on the same area) is appropriately set on the basis of information input from the operation panel 1010 by the user and image information received from a host apparatus.

Next, an example of the multi-pass recording which can by executed by the above-mentioned recording apparatus will be described by using FIG. 2. Herein, as an example of the multi-pass recording, the two-pass recording is exemplified for description, but the present invention is not limited to the two-pass recording, and a pass recording of three passes, four passes, eight passes, 16 passes, or the like (M is an integer equal to larger than 2) may be adopted. It should be noted that the "M (M is an integer equal to larger than 2)-pass mode" which is preferably applied in the present invention refers to a mode in which the recording is performed on the same area on the recording medium by performing the scanning of the recording element group by M times through the intervention of the conveyance of the recording medium at an amount smaller than the width in the array range of the recording elements. In such an M-pass mode, the amount of the signal conveyance of the recording medium is preferably set to be equal to an amount corresponding to a width which is 1/M of the width in the array range of the recording elements. With such a setting, the above-mentioned width in the conveyance direction in the same area is equal to the width corresponding to the amount of the signal conveyance of the recording medium.

FIG. 2 schematically shows a state of the two-pass recording, illustrating a relative positional relation between the recording head 5004 and the recording area in a case where the recording is performed on a first recording area to a fourth recording area comparable to four same areas. In FIG. 2, only one nozzle array (one recording element group) 51 of a certain color in the recording head 5004 shown in FIG. 1C is illustrated. Then, hereinafter, among plural nozzles (recording elements) constituting the nozzle array (recording element group) 51, a nozzle group located on the upstream side in the conveyance direction is referred to as an upstream nozzle group 51A, and a nozzle group located on the downstream side in the conveyance direction is referred to as a downstream nozzle group 51B. Also, the width in the sub scanning direction (conveyance direction) of the respective same areas (respective recording areas) is equal to a width (640 nozzle width) comparable to approximately the half of the width in the array range of the plural recording elements of the recording head (1280 nozzle width).

In the first scanning, only a part of an image that should be recorded in the first recording area is recorded by using the upstream nozzle group 51A. With regard to each of the pixels, this image data recorded by the upstream nozzle group 51A has a gradation value which is decreased to approximately ½ of a gradation value of original image data (multi-valued image data corresponding to the image that should be finally recorded in the first recording area). After the recording through the above-mentioned first scanning, the recording medium is conveyed by a distance worth 640 nozzles in a Y direction.

Subsequently, in the second scanning, only a part of an image that should be recorded in the second recording area is recorded by using the upstream nozzle group 51A, and also the image that should be recorded in the first recording area is completed by using the downstream nozzle group 51B. This image data recorded by the downstream nozzle group 51B also has a gradation value which is decreased to approximately ½ of the gradation value of the original image data (multi-valued image data corresponding to the image that should be finally recorded in the first recording area). According to this, in the first recording area, the image data whose gradation value is decreased to approximately ½ is recorded by two times, and therefore the gradation value of the original image data is saved. After the recording through the above-mentioned second scanning, the recording medium is conveyed by the distance worth 640 nozzles in the Y direction.

Subsequently, in the third scanning, only a part of an image that should be recorded in the third recording area is recorded by using the upstream nozzle group 51A, and also the image that should be recorded in the second recording area is completed by using the downstream nozzle group 51B. After this, the recording medium is conveyed by the distance worth 640 nozzles in the Y direction. Finally, in the fourth scanning, only a part of an image that should be recorded in the fourth recording area is recorded by using the upstream nozzle group 51A, and also the image that should be recorded in the third recording area is completed by using the downstream nozzle group 51B. After this, the recording medium is conveyed by the distance worth 640 nozzles in the Y direction. A similar recording operation is performed on the other recording areas. By repeatedly performing the above-mentioned recording main scanning and the conveyance operation, the two-pass recording is performed on the respective recording areas.

Control Unit Electric Specification Outline

Figure 3:
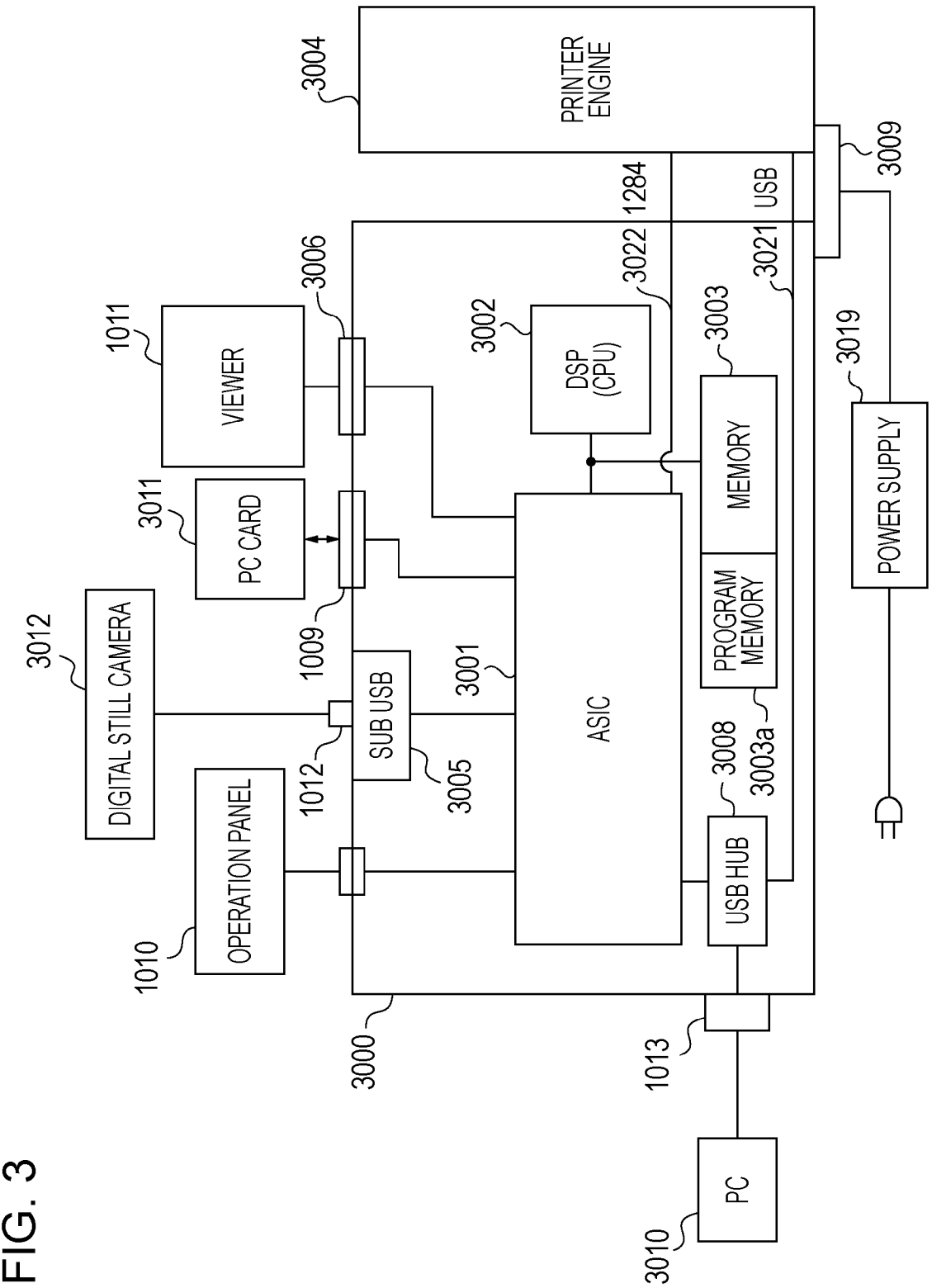
FIG. 3 is a block diagram showing components in a main part related to a control on the printer of FIGS. 1A to 1C.

FIG. 3 is a block diagram showing components in a main part related to a control on the PD printer 1000 of FIGS. 1A to 1C. In FIG. 3, parts common to those in the drawings described above are assigned with the same reference numerals, and a description thereof will be omitted. As will be understood from the following description, the PD printer 1000 functions as an image processing apparatus.

In FIG. 3, reference numeral 3000 denotes a control unit (control substrate), and 3001 denotes an image processing ASIC (dedicated custom LSI). A digital signal processor (DSP) 3002 has a CPU therein and handles various control processings which will be described below, various image processings shown in FIG. 4, and the like. A memory 3003 has a program memory 3003a for storing a control program for the CPU of the DSP 3002 as well as a RAM area for storing a program at the time of the execution and a memory area functioning as a work memory for storing the image data and the like. Denoted by 3004 is a printer engine. Herein, a printer engine of an inkjet printer for printing a color image by using color ink of a plurality of colors is mounted. A USB connector 3005 is used as a port for connecting a digital still camera (DSC) 3012. A connector 3006 is used for connecting a viewer 1011. When the PD printer 1000 performs printing on the basis of image data from a PC 3010, a USB hub 3008 lets the data from the PC 3010 pass through to be output via the USB 3021 to the printer engine 3004. According to this, the connected PC 3010 can execute the printing while directly exchanging the data and signals with the printer engine 3004 (function as a general PC printer). A power supply connector 3009 inputs a direct voltage converted from a commercial AC by a power supply 3019. The PC 3010 is composed of a general personal computer. Denoted by 3011 is the memory card (PC card) described above, and 3012 is the digital still camera (DSC). It should be noted that the exchange of the signals between the control unit 3000 and the printer engine 3004 is performed via the above-mentioned USB 3021 or an IEEE 1284 bus.

First Embodiment

Figure 4:
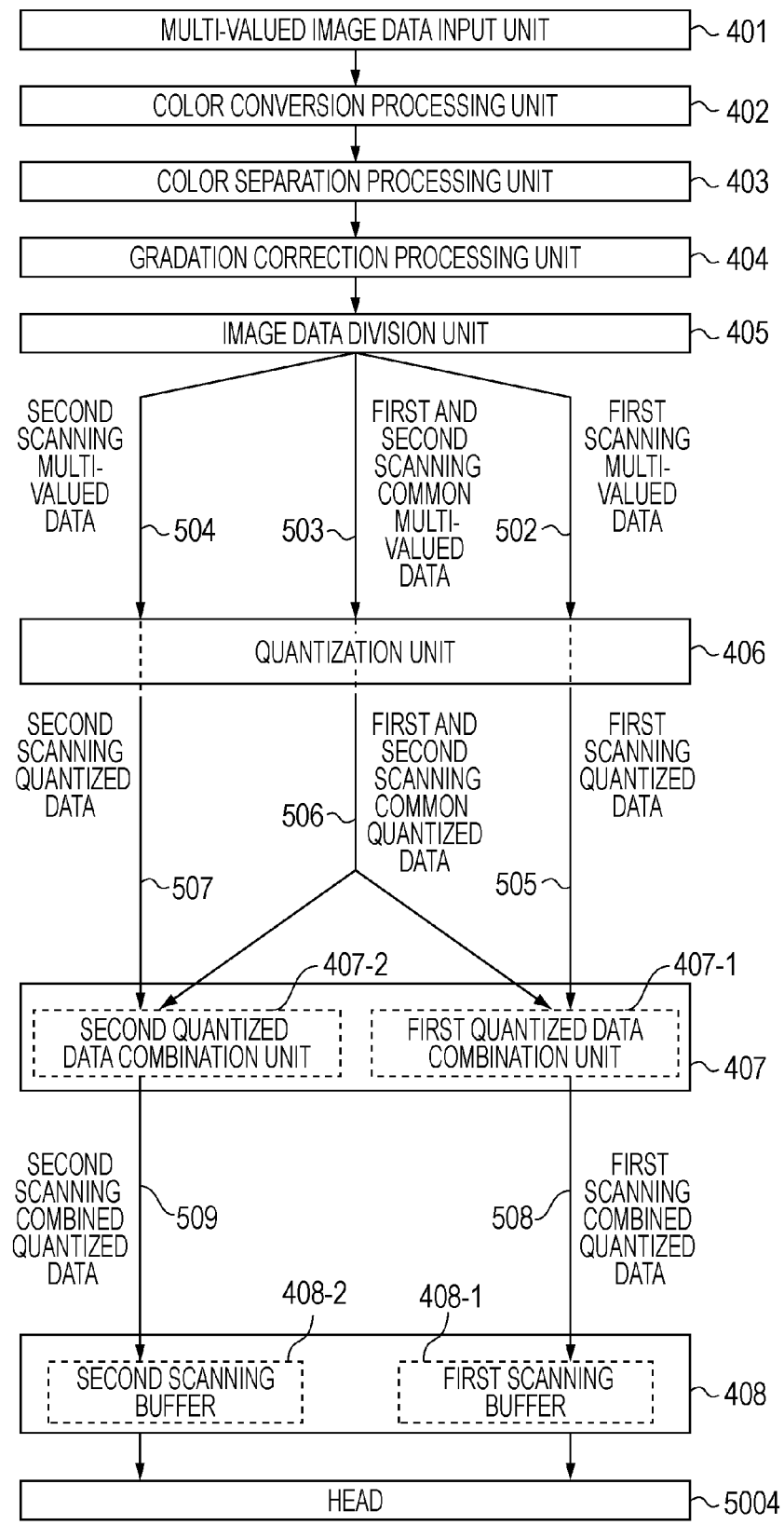
FIG. 4 is a block diagram showing schematic configuration for carrying out a generation processing (image processing) of recording data for performing a two-pass recording.

FIG. 4 is a block diagram showing schematic configuration for carrying out a generation processing (image processing) of recording data for performing a two-pass recording. The control unit 3000 of FIG. 3 is provided with a multi-valued image data input unit 401, a color conversion processing unit 402, a color separation processing unit 403, a gradation correction processing unit 404, an image data division unit 405, a quantization unit 406, a quantized data combination unit 407, and a print buffer 408 which are shown in FIG. 4. Hereinafter, by using FIG. 4, a flow of a processing until two-valued data for two passes is generated from RGB input image data will be described.

The multi-valued image data input unit 401 inputs RGB image data obtained by an external device such as the digital still camera 3012 or the PC 3010. This RGB image data is converted to device RGB image data relying on a color reproduction gamut of the printer by the color conversion processing unit 402. The device RGB image data is converted to multi-valued (256-valued in the present example) image data corresponding to the ink colors used in the printer by the color separation processing unit 403. The printer according to the present embodiment has a configuration of using four color inks of C (cyan), M (magenta), Y (yellow), and K (black). Therefore, the device RGB image data (R'G'B') is converted to multi-valued data (C1, M1, Y1, and K1) corresponding to the CMYK ink. It should be noted that in the color separation processing unit 403, a three-dimensional look up table (LUT) is used which represents corresponding relations among the respective input values (R'G'B' input values) of the device RGB image data and the respective output values (C1, M1, Y1, K1 output values) of the multi-valued image data corresponding to the ink colors. At this time, with regard to an input value falling out of a table grid point value, an output value is calculated through an interpolation from output values of surrounding table grid point values.

Next, the gradation correction processing unit 404 performs a gradation correction processing, but a subsequent processing after this gradation correction processing is similarly performed with respect to CMYK. Therefore, a data processing on black (K) will be described below as a representative. To the gradation correction processing unit 404, multi-valued data K1 generated by the color separation processing unit 403 is input. The gradation correction processing unit 404 applies a gradation correction on this multi-valued data K1 to generate gradation corrected multi-valued data K2. This gradation corrected multi-valued data K2 is input to the image data division unit 405.

The image data division unit 405 divides the gradation corrected multi-valued data K2 into first scanning multi-valued data 502 corresponding only to the first scanning, second scanning multi-valued data 504 corresponding only to the second scanning, and first and second scanning common multi-valued data 503 common to the first scanning and the second scanning. Then, the first scanning multi-valued data 502, the first and second scanning common multi-valued data 503, and the second scanning multi-valued data 504 are input to the quantization unit 406.

The quantization unit 406 performs a quantization processing on the first scanning multi-valued data 502, the first and second scanning common multi-valued data 503, and the second scanning multi-valued data 504 (according to the present embodiment, the binarization processing). According to this, first scanning quantized data 505 obtained by quantizing the first scanning multi-valued data 502, first and second scanning common quantized data 506 obtained by quantizing the first and second scanning common multi-valued data 503, and second scanning quantized data 507 obtained by quantizing the second scanning multi-valued data 504 are generated.

According to the present embodiment, as a quantization processing, a binarization processing based on an exclusive error diffusion method is executed. This exclusive error diffusion method will be described in detail below but is basically a processing as follows: that is, in order that the recording pixels (pixels where dots are recorded) decided on the basis of each of first to third quantized data corresponding to the three planes (first scanning quantized data functioning as the first quantized data, second scanning quantized data functioning as the second quantized data, and first and second scanning common quantized data functioning as the third quantized data) are mutually exclusive, an error diffusion is performed on the first scanning multi-valued data, the first and second scanning common multi-valued data, and the second scanning multi-valued data. To elaborate, quantized results are control in such a manner that the locations of the recording pixels decided on the basis of the first scanning quantized data 505, the locations of the recording pixels decided on the basis of the first and second scanning common quantized data 506, and the locations of the recording pixels decided on the basis of the second scanning quantized data 507 are not mutually overlapped on the recording medium. According to this, it is possible to control the amount of recording pixels decided on the basis of the first and second scanning common quantized data, in other words, the amount of pixels where the dots are recoded through both the first scanning and the second scanning.

The first scanning quantized data 505, the first and second scanning common quantized data 506, and the second scanning quantized data 507 generated by the quantization unit 406 are input to the quantized data combination unit 407. To be specific, the first scanning quantized data 505 and the first and second scanning common quantized data 506 are input to a first quantized data combination unit 407-1, and the second scanning quantized data 507 and the first and second scanning common quantized data 506 are input to a second quantized data combination unit 407-2. The first quantized data combination unit 407-1 generates first scanning combined quantized data 508 through a combination processing of the first scanning quantized data 505 and the first and second scanning common quantized data 506 (in the present example, OR). On the other hand, the second quantized data combination unit 407-2 generates second scanning combined quantized data 509 through a combination processing of the second scanning quantized data 507 and the first and second scanning common quantized data 506 (in the present example, OR).

The first scanning combined quantized data 508 and the second scanning combined quantized data 509 generated by the quantized data combination unit 407 are transferred to the print buffer 408. Then, the first scanning combined quantized data 508 is stored in a first scanning buffer 408-1, and the second scanning combined quantized data 509 is stored in a second scanning buffer 408-2.

Then, the first scanning combined quantized data stored in the first scanning buffer is read at the time of the first scanning to be transferred to the recording head 5004, and the dot recording based on the first scanning combined quantized data is executed in the first scanning. Similarly, the second scanning combined quantized data stored in the second scanning buffer is read at the time of the second scanning to be transferred to the recording head 5004, and the dot recording based on the second scanning combined quantized data is executed in the second scanning. According to this, the image that should be recorded is completed by performing the scanning by two times with respect to the same area.

Figure 5:
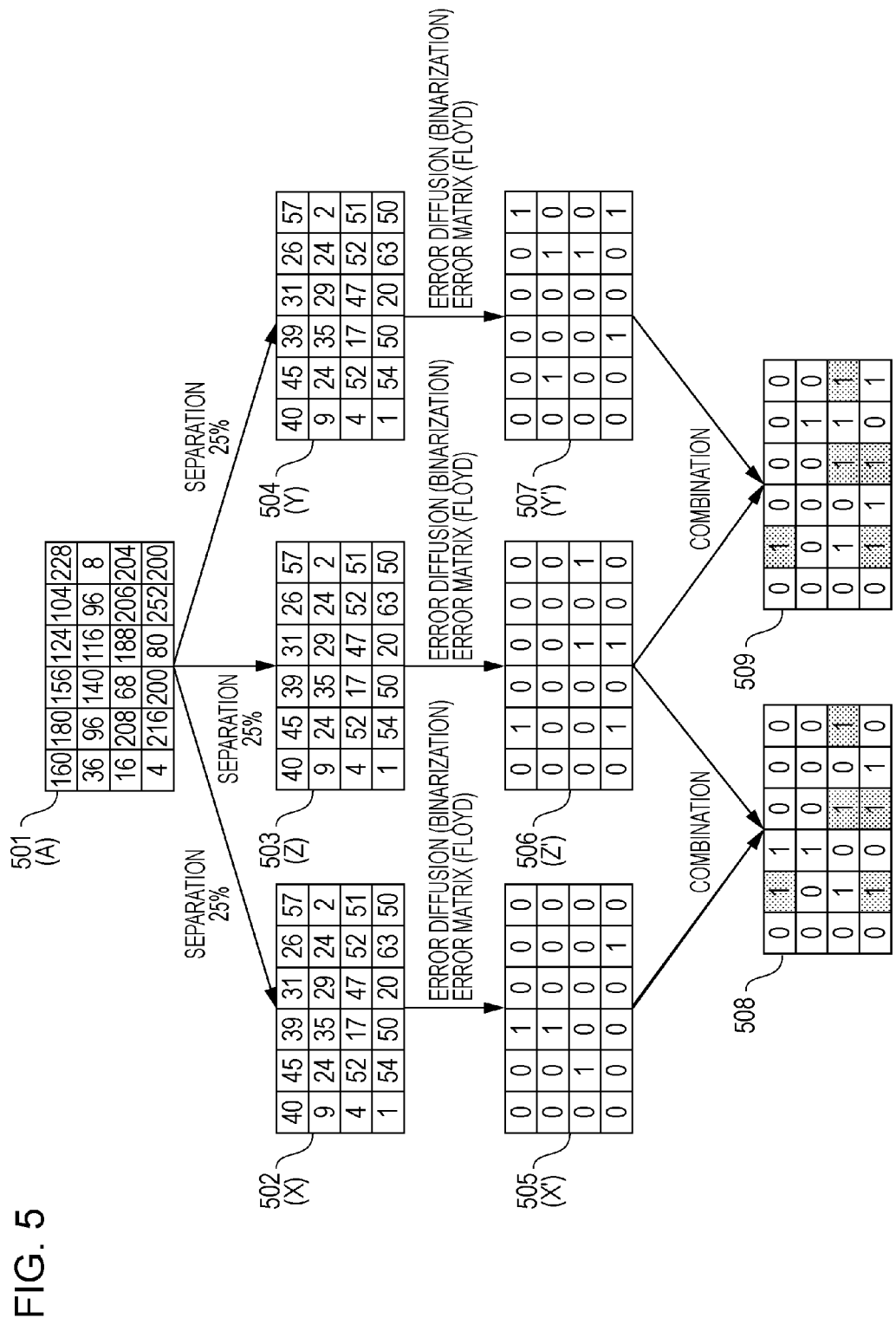
FIG. 5 schematically shows the image processing shown in FIG. 4 (an image data division processing→a quantization processing→a quantized data combination processing).

Next, the image data division processing (405), the quantization processing (406), and the quantized data combination processing (407) mentioned above will be described with reference to FIG. 5. FIG. 5 schematically illustrates the image processing shown in FIG. 4 (the image data division processing→the quantization processing→the quantized data combination processing). Herein, a case will be described in which multi-valued image data 501 corresponding to total 24 pixels of four pixels (sub scanning direction)× six pixels (main scanning direction). The multi-valued image data 501 is comparable to the gradation corrected multi-valued data K2 input to the image data division unit 405 of FIG. 4.

First, the image data division unit 405 divides the multi-valued image data 501 by three for each pixel to generate the first scanning multi-valued data 502, the second scanning multi-valued data 504, and the first and second scanning common multi-valued data 503. At this time, a value of the multi-valued image data 501 is set as A, a value of the first scanning multi-valued data 502 is set as X, a value of the second scanning multi-valued data 504 is set as Y, and a value of the first and second scanning common multi-valued data 503 is set as Z, the division processing is performed so that X+Y+2Z=A is satisfied and also X and Y and Z have approximately the same value. For that reason, according to the present embodiment, the above-mentioned division processing is performed so that the values of X, Y, and Z become approximately ¼ (25%) of the value of the multi-valued image data "A". To be more specific, a quotient $\alpha$ and a remainder $\beta$ (0 to 3) are calculated when "A" is divided by 4, and from the quotient $\alpha$ and the remainder $\beta$, X, Y, and Z are decided as follows.

In the case of $\beta=0 \rightarrow X=Y=Z=\alpha$
In the case of $\beta=1 \rightarrow X-1=Y=Z=\alpha$
In the case of $\beta=2 \rightarrow X-1=Y-1=Z=\alpha$
In the case of $\beta=3 \rightarrow X-1=Y=Z-1=\alpha$ The thus decided X, Y, and Z respectively become a value of the first scanning multi-valued data 502, a value of the second scanning multi-valued data 504, and a value of the first and second scanning common multi-valued data 503 shown in FIG. 5. For example, in a case where the value of the multi-valued image data A is "160", $\alpha=40$ and $\beta=0$ are established, and thus X=Y=Z=$\alpha$=40 is obtained. It should be noted that the multi-valued image data 501 is 256-valued data, and the value of A is one value selected from 0 to 255.

Subsequently, the quantization unit 406 performs an exclusive error diffusion processing on the first scanning multi-valued data 502, the first and second scanning common multi-valued data 503, and the second scanning multi-valued data 504. A threshold used for this error diffusion processing is "128". Also, for an error distribution matrix representing error distribution coefficients with respect to the surrounding pixels at the time of performing the error diffusion processing, Floyd's error distribution matrix shown in FIG. 6A is used. The first scanning quantized data 505 is two-valued data obtained by quantizing the first scanning multi-valued data 502. "1" denotes a pixel where a dot is recorded, and "0" denotes a pixel where a dot is not recorded. Similarly, the first and second scanning common quantized data 506 is two-valued data obtained by quantizing the first and second scanning common multi-valued data 503, and the second scanning quantized data 507 is two-valued data obtained by quantizing the second scanning multi-valued data 504. As understood from FIG. 5, the locations of the recording pixels decided by each of the two-valued quantized data 505 to 507 are not mutually overlapped. In this manner, according to the present embodiment, in order that the locations of the recording pixels decided by the two-valued quantized data 505 to 507 are mutually exclusive, the error diffusion processing is performed on the multi-valued data 502 to 504 on the three planes. Hereinafter, with reference to FIG. 7, the exclusive error diffusion processing will be described.

Figure 7:
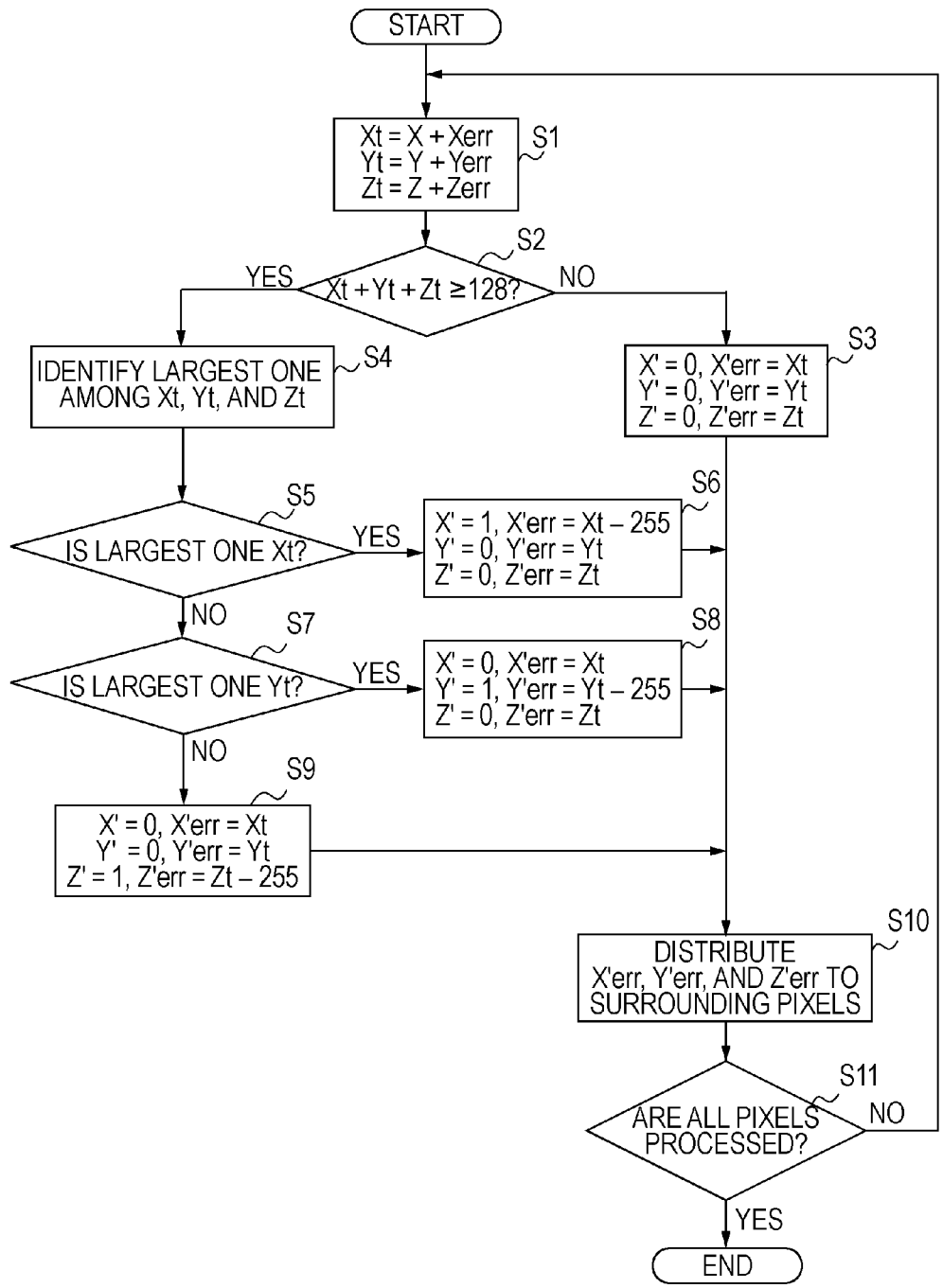
FIG. 7 is a flow chart showing a two-valued exclusive error diffusion processing according to a first embodiment of the present invention.

FIG. 7 is a flow chart for describing the exclusive error diffusion processing. First, symbols in the drawing will be described. X, Y, and Z are values of the multi-valued data (502, 504, and 503) on the three planes which are input to the quantization unit 406 as described above and each have a value of 0 to 255. Xerr, Yerr, and Zerr are integral error values generated from surrounding pixels where the quantization processing (the binarization processing) has been already ended. It should be noted that in the present example, in order that errors generated through the quantization processing are saved for each plane, quantization processing errors generated in the respective planes are distributed to surrounding pixels in its own plane. Xt, Yt, and Zt are total values of the values of the multi-valued data (X, Y, and Z) and the integral error values (Xerr, Yerr, Zerr). X', Y', and Z' are values of the quantized data (505, 507, and 506) which are results of the quantization processing (the binarization processing). X'err, Y'err, and Z'err are error values generated through the quantization processing in the focus pixel.

When the present processing is started, first, in step S1, Xt, Yt, and Zt are calculated with regard to the focus pixel. Subsequently, in step S2, it is determined whether an added value obtained by adding Xt, Yt and Zt (Xt +Yt+Zt) is equal to or larger than a threshold (128). In a case where it is determined that the added value is smaller than the threshold, the flow advances to step S3, and in order that the focus pixel is not recorded by any scanning, the binarization result is decided as X'=Y'=Z'=0. Also, the errors generated through this binarization processing are saved as X'err=Xt, Y'err=Yt, and Z'err=Zt, and the flow advances to step S10.

On the other hand, in step S2, it is determined that the added value is equal to or larger than the threshold, the flow advances to step S4, and in order to decide the plane for setting the focus pixel in the recording pixels, one largest value parameter is identified among Xt, Yt, and Zt. It should be however noted that in a case where two or more of the largest value parameters exist, one parameter is identified while setting a priority order of Zt, Xt, and Yt in the stated order. It should be noted that the priority order is not limited to this, and Xt or Yt may be set as the first priority.

Subsequently, in step S5, it is determined as to whether the parameter identified in step S4 is Xt. In a case where it is determined that the identified parameter is Xt, the flow advances to step S6, and in order that the focus pixel is recorded only by the first scanning, the binarization results are decided as X'=1, Y'=0, and Z'=0. Also, the errors generated through this binarization processing are saved as X'err=Xt−255, Y'err=Yt, and Z'err=Zt, and thereafter, the flow advances to step S10. On the other hand, in step S5, in a case where it is determined that the identified parameter is not Xt, the flow advances to step S7, and it is determined as to whether the parameter identified in step S4 is Yt. In a case where it is determined that the identified parameter is Yt, the flow advances to step S8, and in order that the focus pixel is recorded only by the first scanning, the binarization results are decided as X'=0, Y'=1, and Z'=0. Also, the errors generated through this binarization processing are saved as X'err=Xt, Y'err=Yt−255, and Z'err=Zt, and thereafter, the flow advances to step S10. In a case where it is determined that the identified parameter is not Yt in step S7, the flow advances to step S9, and in order that the focus pixel is recorded by both the first scanning and the second scanning, the binarization results are decided as X'=0, Y'=0, and Z'=1. Also, the errors generated through this binarization processing are saved as X'err=Xt, Y'err=Yt, and Z'err=Zt−255, and thereafter, the flow advances to step S10.

In step S10, X'err, Y'err, and Z'err saved in step S3, S6, S8, or S9 are respectively distributed to the surrounding pixels of its own plane while following the error distribution matrix of FIG. 6A. In this manner, the quantization processing on the focus pixel is ended, and the flow advances to step S11. In step S11, it is determined as to whether the quantization processing is ended for all the pixels, and when the quantization processing is not ended for all the pixels, the flow returns to step S1, and the next focus pixel is processed similarly as in the above-mentioned manner. When the quantization processing is ended for all the pixels, the exclusive error diffusion processing is ended. An integral error value used in step S1 (for example, Xerr) is an integral value of the quantization errors (for example, X'err) distributed from one or plural pixels in step S10.

Through the above-mentioned exclusive error diffusion processing, the quantized data on the three planes (the first scanning quantized data 505 (X'), the first and second scanning common quantized data 506 (Y'), the second scanning quantized data 507 (Z')) where the positions of the recording pixels are not mutually overlapped are generated as shown in FIG. 5.

The description will be made while referring back to FIG. 5. The first scanning quantized data 505 and the first and second scanning common quantized data 506 are subjected to a combination processing by the first quantized data combination unit 407-1 (in the present example, OR) to generate the two-valued first scanning combined quantized data 508. In the first scanning combined quantized data 508, the pixel assigned with "1" is a pixel which becomes a recording target in the first scanning, and the pixel assigned with "0" is a pixel which does become the recording target in the first scanning. Also, the shaded pixel is a pixel which becomes a common recording target by the first scanning and the second scanning. Similarly, the second scanning quantized data 507 and the first and second scanning common quantized data 506 are subjected to a combination processing by the second quantized data combination unit 407-2 (in the present example, OR) to generate the two-valued second scanning combined quantized data 509. In the second scanning combined quantized data 509, the pixel assigned with "1" is a pixel which becomes a recording target in the second scanning, and the pixel assigned with "0" is a pixel which does not become the recording target in the second scanning. Also, the shaded pixel is a pixel which becomes the common recording target by the first scanning and the second scanning.

As described above, according to the present embodiment, it is possible to generate the pixel where the dots are recorded commonly by performing the scanning by the plural times, and therefore the dot coverage variations (image density variations) generated by the conveyance error of the recording medium, the movement error of the carriage, and the like can be suppressed. Also, by quantizing the multi-valued data common to the plural scannings, the amount of the pixels (overlapping dots) where the dots are recorded commonly by performing the scanning by the plural times is controlled, and it is therefore possible to suppress the degradation of the granularity due to the excess of the amount of the overlapping dots. According to this, while suppressing the image density variations, it is possible to hold the granularity to a low level.

Figure 10A:
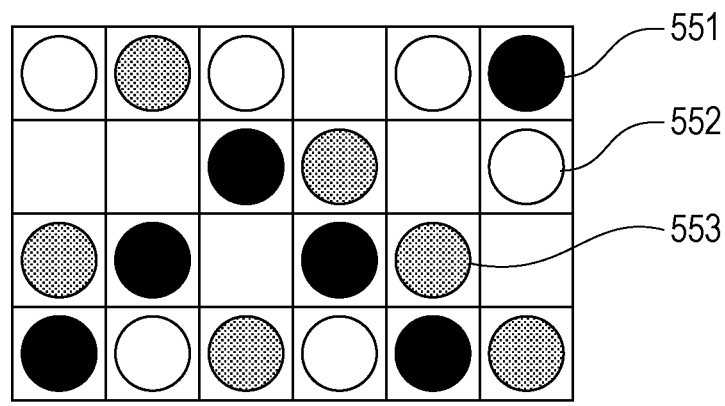
FIGS. 10A and 10B show arrangement states of dots recorded by performing a scanning by two times.
Figure 10B:
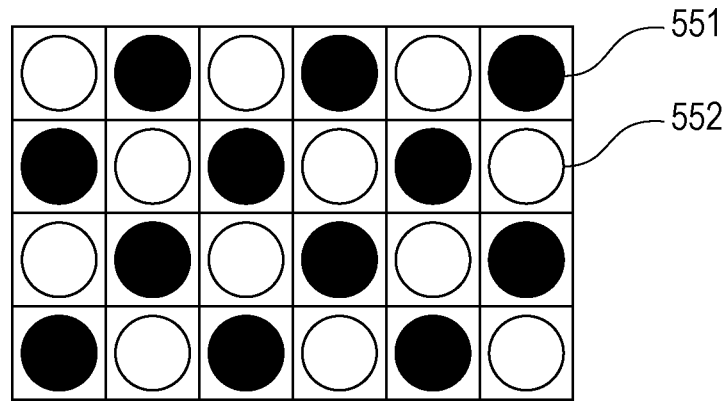

It should be noted that according to the present embodiment, the division processing is performed so that $X+Y+2Z=A$ is satisfied and also X, Y, and Z are approximately the same value, but the configuration is not limited to this. If $X+Y+2Z=A$ is satisfied, it is not necessary to change the value of the multi-valued data before and after the division processing, and a density keeping quality of the image is extremely superior. However, even if $X+Y+2Z=A$ is not satisfied, if the value of $X+Y+2Z$ is approximately the value of A, the density keeping quality of the image can be sufficiently secured. Also, when the processing according to the present embodiment is executed, even when the value of the multi-valued image data 501 is a value indicating the highest density value (255), a pixel where dots are not recorded as shown in FIG. 10A is generated. In the case of the dot arrangement as shown in FIG. 10A, the image density is lower as compared with the dot arrangement of a 100% solid image shown in FIG. 10B. Although the image density is sufficient also in the dot arrangement shown in FIG. 10A, in a case where a still higher density is desired to be realized, it is also possible to set the values of X, Y, and Z so that the total value of $X+Y+2Z$ is equal to or larger than the value of A.

Second Embodiment

According to the first embodiment, the above-mentioned exclusive error diffusion processing is performed, and in contrast, according to this second embodiment, it is characterized that that the error diffusion processing is performed on the multi-valued data 502 to 504 by using the error distribution matrices shown in FIG. 6A to 6C. Points other than this are similar to the first embodiment, and a description thereof will be omitted.

To the quantization unit 406 of FIG. 4, the first scanning multi-valued data 502, the first and second scanning common multi-valued data 503, and the second scanning multi-valued data 504 generated by the image data division unit 405 are input. The quantization unit 406 performs a two-valued diffusion processing on the first scanning multi-valued data 502 to generate the first scanning quantized data 505. At this time, for the threshold, "128" is used, and for the error distribution matrix, the error distribution matrix shown in FIG. 6B is used. Also, the quantization unit 406 performs the two-valued diffusion processing on the first and second scanning common multi-valued data 503 to generate the first and second scanning common quantized data 506. At this time, for the threshold, "128" is used, and for the error distribution matrix, the error distribution matrix shown in FIG. 6A is used. Furthermore, the two-valued diffusion processing is performed on the second scanning multi-valued data 504 to generate the second scanning quantized data 507. At this time, for the threshold, "128" is used, and for the error distribution matrix, the error distribution matrix shown in FIG. 6C is used.

By using the error distribution matrices different among the three plains as described above, the quantization results on the three planes (locations of the recording pixels decided by the quantized data 505 to 507) can be set different from each other. According to this, while the pixel recorded by both the first scanning and the second scanning (overlapping dots) are generated, the pixel recorded only by the first scanning and the pixel recorded only by the second scanning can also be generated. If the error distribution matrix is used among the three planes, the quantization results on the three planes are particularly similar to each other. Then, the pixel recorded by the first scanning and the pixel recorded by the second scanning are substantially the same. Even in a case where an image at the highest density is recorded, the dots are overlapped in almost all the recording pixels, but on the other hand, dots are not recorded in half of the pixels, and a white background widely exists. In such a case, the output image density with respect to the input value is difficult to be saved. However, according to the present embodiment, as described above, the quantization results on the three planes are different from each other, and not only the pixel recorded by both the first scanning and the second scanning but also the pixel recorded only by the first scanning and the pixel recorded only by the second scanning are generated, and thus the density keeping quality of the output image can be secured to some extent.

Incidentally, the locations of the recording pixels (pixels assigned with "1") decided by each of the two-valued quantized data 505 to 507 generated through the processing according to the present embodiment do not have a complete exclusion relation, and therefore the positions of the recording pixels may be overlapped. For example, the binarization results with regard to a certain pixel both have "1" for the quantized data 505 and the quantized data 506 in some cases. Therefore, as a combination processing after this, if a logical processing is applied similarly as in the above-mentioned first embodiment, the number of the recording pixels after the combination processing is smaller than the number of the recording pixels decided by the quantized data 505 to 507. Then, the density keeping quality of the output image with respect to the input value is decreased. In a case where this density decrease is permissible, an OR processing can be applied as the combination processing. On the other hand, in a case where the above-mentioned density decrease cannot be permissible, the above-mentioned combination processing may be executed so that the value of the quantized data ("1" or "0") is added for each pixel and the added value becomes the value of the combined quantized data. For example, with regard to a certain pixel A, in a case where the values of the quantized data 505 and the quantized data 506 are both "1", the value of the first scanning combined quantized data 508 is set as 2 (=1+1). Then, the number of the dots in accordance with such an added value (0, 1, and 2) are recorded through the respective scannings. With this configuration, the density keeping quality of the output image with respect to the input value does not need to be decreased.

According to the present embodiment as described above, similarly as in the first embodiment, the amount of the pixels recorded by both the first scanning and the second scanning (overlapping dots) can be controlled, and therefore it is possible to suppress both the image density variations and the granularity degradation described above. In addition to this, according to the present embodiment, as the error diffusion processing on the three planes is independently performed, it is possible to improve the processing speed as compared with a case in which the exclusive error diffusion processing according to the first embodiment is performed.

It should be noted that according to the present embodiment, the case has been described in which the error distribution matrices used among the planes are different from each other in order to set the quantization results on the three planes to be different from each other. However, the present embodiment is not limited to this, and for example, the error distribution matrix used among the planes may be set the same and the thresholds used among the planes may be set different from each other instead. Also, combinations of the error distribution matrices and thresholds may be varied among the planes.

Third Embodiment

According to the first and second embodiments, the quantization processing based on the error diffusion method is performed in the quantization unit 406, but in contrast, according to this third embodiment, it is characterized that a quantization processing based on a dither method is performed in the quantization unit 406. Points other than this are similar to the above-mentioned embodiments, and a description thereof will be omitted.

To the quantization unit 406 of FIG. 4, the first scanning multi-valued data 502, the first and second scanning common multi-valued data 503, and the second scanning multi-valued data 504 generated by the image data division unit 405 are input. The quantization unit 406 performs a dither processing using different dither matrices respectively on the first scanning multi-valued data 502, the first and second scanning common multi-valued data 503, and the second scanning multi-valued data 504. In this manner, by performing the dither processing (the quantization processing) using the three different dither matrices, it is possible to generate the three pieces of quantized data 505 to 507 whose quantization results are different from each other.

According to the third embodiment described above, similarly as in the second embodiment, while the density keeping quality of the output image is secured to some extent, it is possible to suppress both the image density variations and the granularity degradation. In addition to this, according to the present embodiment, as the dither processing is independently performed on the multi-valued data on the three planes, it is possible to realize the even faster processing speed. Furthermore, according to the present embodiment, as the dither processing using the three different dither matrices is performed, the control on the spatial frequency in the dot arrangement in the respective scannings and the overlapping dot arrangement among the scannings becomes easier as compared with the case of performing the error diffusion processing.

Fourth Embodiment

According to the first to third embodiments described above, the binarization processing is performed as the quantization processing, but according to this fourth embodiment, it is characterized that a ternarization processing is performed as the quantization processing. Points other than this are similar to the above-mentioned embodiments, and a description thereof will be omitted. According to the present embodiment, the binarization processing according to any one of the first to third embodiments may be replaced by the ternarization processing, but herein, a case will be described in which the binarization processing according to the first embodiment is replaced by the ternarization processing. According to the present embodiment, in order that the positions of the recording pixels decided by each of the three-valued quantized data 505 to 507 are not mutually overlapped, a three-valued exclusive error diffusion processing is performed on the multi-valued data 502 to 504.

Figure 8:
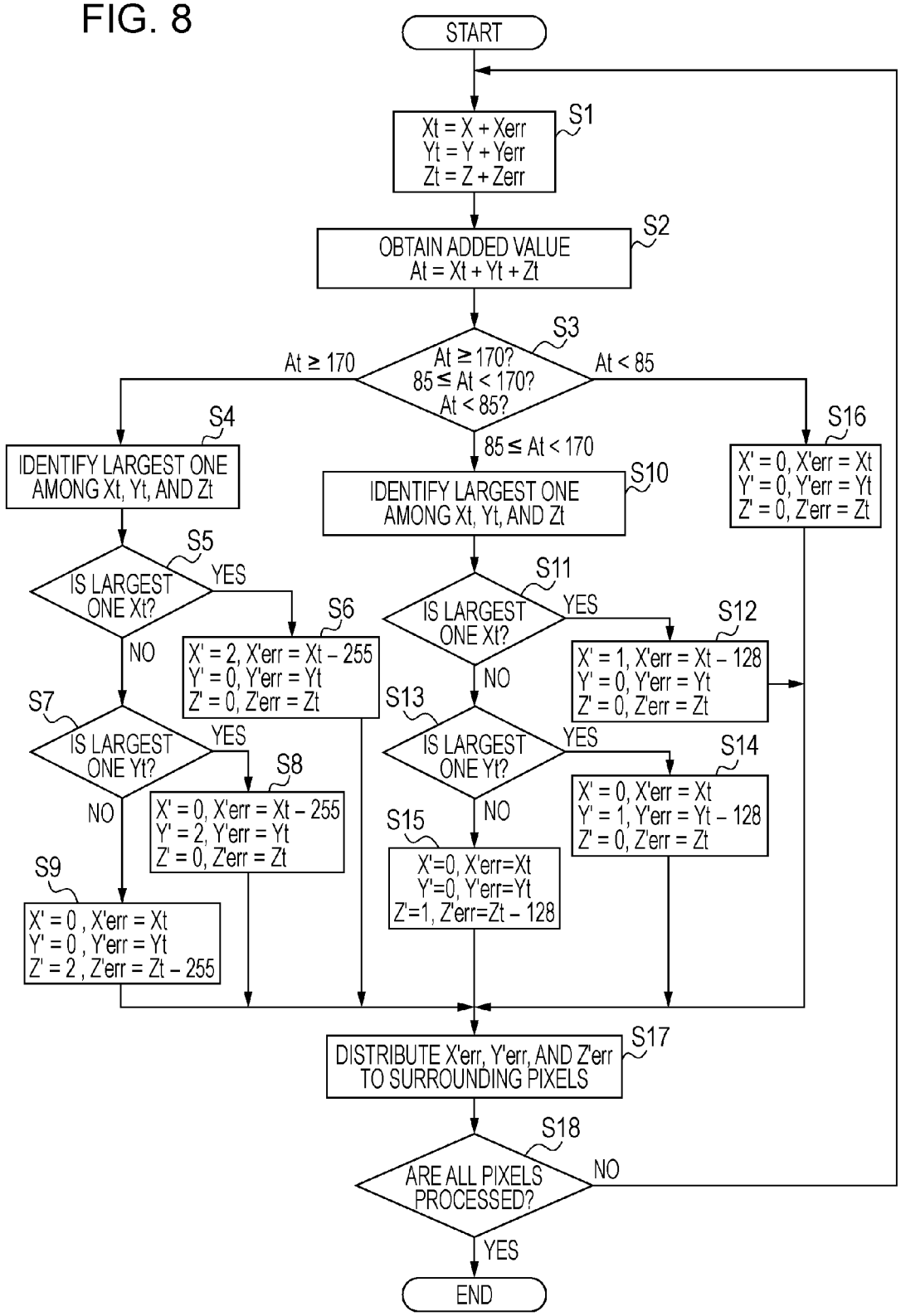
FIG. 8 is a flow chart showing a three-valued exclusive error diffusion processing according to a second embodiment of the present invention.

FIG. 8 is a flow chart for describing the three-valued exclusive error diffusion processing. Meanings of symbols (such as Xt, Xerr, and X') in FIG. 8 are the same as the meanings of the symbols in FIG. 7. According to the present embodiment, a first threshold (170) and a second threshold (85) are used as thresholds. Also, values of X', Y', and Z' which are results of the ternarization processing are each a value selected from "0", "1", and "2". Herein, "0" indicates that no dot is recorded, "1" indicates that one dot is recorded, and "2" indicates that two dots are recorded.

When the present processing is started, first, in step S1, Xt, Yt, and Zt are calculated with regard to the focus pixel. Subsequently, in step S2, an added value At (=Xt+Yt+Zt) obtained by adding Xt, Yt, and Zt is obtained. Subsequently, in step S3, it is determined as to whether the added value At is equal to or larger than the first threshold (170), the added value At is smaller than the first threshold and also is equal to or larger than the second threshold (85), and the added value At is smaller than the second threshold.

In step S3, in a case where it is determined that the added value At is smaller than the second threshold (85), the flow advances to step S16, and in order that the focus pixel is not recorded by any scanning, ternarization results are decided as X'=Y'=Z'=0. Also, the errors generated through this ternarization processing are saved as X'err=Xt, Y'err=Yt, and Z'err=Zt, and the flow advances to step S17.

On the other hand, in step S3, in a case where it is determined that the added value At is equal to or larger than the first threshold (170), the flow advances to step S4, and in order that a plane is decided for setting the focus pixel as the recording pixel ("1"), one largest value parameter is identified among Xt, Yt, and Zt. It should be however noted that in a case where two or more of the largest value parameters exist, one parameter is identified on the basis of a priority order of Zt, Xt, and Yt in the stated order. It should be noted that the priority order is not limited to this, and Xt or Yt may be set as the first priority. Subsequently, in step S5, it is determined as to whether the largest parameter identified in step S4 is Xt. In a case where it is determined that the largest parameter is Xt, the flow advances to step S6, and in order that two dots are recorded in the focus pixel by the first scanning, the ternarization results are set as X'=2, Y'=0, and Z'=0. Also, the errors generated through this ternarization processing are saved as X'err=Xt−255, Y'err=Yt, and Z'err=Zt, and thereafter, the flow advances to step S17. On the other hand, in step S5, in a case where it is determined that the largest parameter is not Xt, the flow advances to step S7, and it is determined as to whether the largest parameter identified in step S4 is Yt. In a case where it is determined that the largest parameter is Yt, the flow advances to step S8, and in order that two dots are recorded in the focus pixel by the second scanning, the ternarization results are set as X'=0, Y'=2, and Z'=0. Also, the errors generated through this ternarization processing are saved as X'err=Xt, Y'err=Yt−255, and Z'err=Zt, and thereafter, the flow advances to step S17. In step S7, in a case where it is determined that the largest parameter is not Yt, the flow advances to step S9, and in order that two dots each are recorded in the focus pixel by the first scanning and the second scanning, the binarization results are decided as X'=0, Y'=0, and Z'=2. Also, the errors generated through this binarization processing are saved as X'err=Xt, Y'err=Yt, and Z'err=Zt−255, and thereafter, the flow advances to step S17.

On the other hand, in step S3, in a case where it is determined that the added value At is smaller than the first threshold (170) and also equal to or larger than the second threshold (85), the flow advances to step S10. Then, in step S10, in order that a plane is decided for setting the focus pixel as the recording pixel ("2"), one largest value parameter is identified among Xt, Yt, and Zt while following a similar rule as step S4. Subsequently, in step S11, it is determined as to whether the largest parameter identified in step S10 is Xt. In a case where it is determined that the largest parameter is Xt, the flow advances to step S12, and in order that one dot is recorded in the focus pixel by the first scanning, the ternarization results are decided as X'=1, Y'=0, and Z'=0. Also, the errors generated through this ternarization processing are saved as X'err=Xt−128, Y'err=Yt, and Z'err=Zt, and thereafter, the flow advances to step S17. On the other hand, in step S11, in a case where it is determined that the largest parameter is not Xt, the flow advances to step S13, and it is determined as to whether the largest parameter identified in step S10 is Yt. In a case where it is determined that the largest parameter is Yt, the flow advances to step S14, and in order that one dot is recorded in the focus pixel by the second scanning, the ternarization results are decided as X'=0, Y'=1, and Z'=0. Also, the errors generated through this ternarization processing are saved as X'err=Xt, Y'err=Yt−128, and Z'err=Zt, and thereafter, the flow advances to step S17. In step S13, in a case where it is determined that the largest parameter is not Yt, the flow advances to step S15, and in order that one dot is recorded each in the focus pixel by the first scanning and the second scanning, the binarization results are decided as X'=0, Y'=0, and Z'=1. Also, the errors generated through this binarization processing are saved as X'err=Xt, Y'err=Yt, and Z'err=Zt−128, and thereafter, the flow advances to step S17.

In step S17, X'err, Y'err, and Z'err saved in step S6, S8, S9, S12, S14, S15, or S16 are respectively distributed to the surrounding pixels of its own plane while following the error distribution matrix of FIG. 6A. In this manner, the quantization processing on the focus pixel is ended, and the flow advances to step S18. In step S18, it is determined as to whether the quantization processing is ended for all the pixels, and when the quantization processing is not ended for all the pixels, the flow returns to step S1, and the next focus pixel is processed similarly as in the above-mentioned manner. When the quantization processing is ended for all the pixels, the exclusive error diffusion processing is ended. Through the above-mentioned exclusive error diffusion processing, the quantized data on the three planes (the first scanning quantized data 505 (X'), the first and second scanning common quantized data 506 (Y'), the second scanning quantized data 507 (Z')) where the positions of the recording pixels are not mutually overlapped are generated.

As described above, according to the present embodiment, in addition to the effects obtained through the above-mentioned embodiments, it is possible to obtain the image superior in gradation representation as compared with the above-mentioned embodiments where the binarization processing is performed. It should be noted that in a case where a plurality of dots are formed in the pixel area, ink may be ejected towards the same location in the pixel area by plural times, or ink may be ejected towards different locations in the pixel area by plural times.

The present embodiment is not limited to the case in which the binarization processing according to the first embodiment is replaced by the ternarization processing, but also the binarization processing according to the second or third embodiment may be replaced by the ternarization processing. In a case where the binarization processing according to the second or third embodiment is replaced by the ternarization processing, as the quantization processing, the three-valued error diffusion processing or the three-valued dither processing may be executed. At this time, in order to set the three-valued quantization results different among the planes, the error distribution matrices and the thresholds or the dither matrices are different for each plane, which is similar to the above-mentioned second and third embodiments. In this manner, in the quantization unit 406, the three-valued quantized data 505 to 507 whose quantization results are different from each other are generated. As the locations of the recording pixels decided by the pieces of three-valued quantized data do not have a complete exclusion relation, and therefore the positions of the recording pixels may be overlapped. Therefore, as the subsequent combination processing, the combination processing of adding the quantized value to each pixel as described in the second embodiment is preferably applied.

Fifth Embodiment

According to the first to fourth embodiments, the two-pass recording for completing the image that should be recorded in the same area by performing the scanning by two times has been described, but the present invention can be applied to the multi-pass recording involving three or more passes. Hereinafter, as an example of the multi-pass recording involving the three or more passes, a case of the three-pass recording will be exemplified for description. It should be noted that the characteristic of the present embodiment resides in the image data division processing, the quantization processing, and the quantized data combination processing, and processing other than these image processings are similar to those according to the above-mentioned embodiments. Hereinafter, with reference to FIG. 9, only the image data division processing, the quantization processing, and the quantized data combination processing will be described.

FIG. 9 schematically shows a flow of the image processings (the image data division processing→the quantization processing→the quantized data combination processing) executed by the image data division unit 405, the quantization unit 406 and the quantized data combination unit 407 in FIG. 4. Similarly as in the first embodiment, the gradation corrected multi-valued data K2 (the multi-valued image data 501) is input to the image data division unit 405.

The image data division unit 405 divides the input multi-valued image data into first scanning multi-valued data 901 corresponding only to the first scanning, second scanning multi-valued data 902 corresponding only to the second scanning, third scanning multi-valued data 903 corresponding only to the third scanning, first and second scanning common multi-valued data 904 corresponding commonly to the first scanning and the second scanning, first and third scanning common multi-valued data 905 corresponding commonly to the first scanning and the third scanning, second and third scanning common multi-valued data 906 corresponding commonly to the second scanning and the third scanning, and first, second, and third scanning common multi-valued data 907 corresponding commonly to all the first scanning, the second scanning, and the third scanning.

Subsequently, the quantization unit 406 performs the two-valued exclusive error diffusion as described in the first embodiment on the multi-valued data 901 to 907 on these seven planes. According to this, first scanning quantized data 911, second scanning quantized data 912, third scanning quantized data 913, first and second scanning common quantized data 914, first and third scanning common quantized data 915, second and third scanning common quantized data 916, and first, second, and third scanning common quantized data 917 are generated.

Subsequently, the quantized data 911 to 917 on these seven planes are input to the quantized data combination unit 407, and the quantized data 911 to 917 are combined for each corresponding scanning. To be specific, the first scanning quantized data 911, the first and second scanning common quantized data 914, the first and third scanning common quantized data 915, and the first, second, and third scanning common quantized data 917 are input to the first quantized data combination unit 407-1. Then, the first quantized data combination unit 407-1 combines the quantized data 911, 914, 915, and 917 (in the present example, OR) to generate first scanning combined quantized data 921. Also, the second scanning quantized data 912, the first and second scanning common quantized data 914, the second and third scanning common quantized data 916, and the first, second, and third scanning common quantized data 917 are input to the second quantized data combination unit 407-2. Then, the second quantized data combination unit 407-2 combines the quantized data 912, 914, 916, and 917 to generate second scanning combined quantized data 922. Furthermore, the third scanning quantized data 913, the first and third scanning common quantized data 915, the second and third scanning common quantized data 916, and the first, second, and third scanning common quantized data 917 are input to a third quantized data combination unit 407-3. The third quantized data combination unit 407-3 combines the quantized data 913, 915, 916, and 917 to generate third scanning combined quantized data 923. Through the above-mentioned processings, it is possible to generate recording data for the three passes. According to the present embodiment, the effect obtained in the first embodiment can be realized in the multi-pass recording involving the three or more passes.

It should be noted that according to the present embodiment, as the quantization processing, the exclusive error diffusion described in the first embodiment is applied, but the quantization processing applicable in the present embodiment is not limited to this. For example, the independent error diffusion processing described in the second and third embodiments or the independent dither processing can also be applied. Also, the quantization processing applicable in the present embodiment is not limited to the binarization processing, the ternarization processing described in the fourth embodiment or a quantization processing involving four or more values.

Also, according to the present embodiment, the division processing is performed so as to generate the common multi-valued data regarding all the combinations of the first, second, and third scannings, but the division processing applicable in the present embodiment is not limited to this. For example, the common multi-valued data may be generated so that the overlapping dots are generated only between particular scannings (the first scanning and the second scanning). In this case, in addition to the first scanning multi-valued data 901, the second scanning multi-valued data 902, and the third scanning multi-valued data 903, as the common multi-valued data, only the first and second scanning common multi-valued data 904 is generated, and the first and third scanning common multi-valued data 905, the second and third scanning common multi-valued data 906, and the first, second, and third scanning common multi-valued data 907 are not generated.

A technical idea of the present invention resides in that the pixels are generated where the dots are recorded both through the at least two scannings, and irrespective of the number of multi-passes, if the multi-valued data corresponding commonly to the at least two scannings is generated, it is possible to obtain the effects of the present invention. Therefore, according to the present invention, in a case where the recording is performed by performing the scanning by M (M is an integer equal to or larger than 2) times, in addition to the multi-valued data corresponding to each of the M scannings, the multi-valued data corresponding commonly to the at least two scannings may be generated, and it is not essential to generate the multi-valued data corresponding commonly to all M scannings.

Other Embodiments

A mode obtained by appropriately combining the first to fifth embodiments is also included in the scope of the present invention.

According to the above-mentioned embodiments, the case has been described in which the serial-system recording apparatus for ejecting the ink during the movement of the recording head with respect to the recording medium (relative scanning) from the recording head to perform the multi-pass recording is used, but the recording apparatus applicable in the present invention is not limited to this. A line-system recording apparatus for ejecting the ink during the conveyance of the recording medium with respect to the recording head (relative scanning) to perform the multi-pass recording can also be applied in the present invention. To elaborate, a mode in which the multi-pass recording is performed during the relative scanning of the recording head and the recording medium can be applied in the present invention.

Also, according to the above-mentioned embodiments, the binarization processing or the ternarization processing is exemplified for the description, but the quantization processing applicable in the present invention is not limited to this, and the quantization processing involving four or more values is also applicable. To elaborate, according to the present invention, an N (N is an integer equal to or larger than 2)-valued quantization processing is applicable. Therefore, a mode in which the first to fifth embodiments are changed into the N-valued processing is also included in the scope of the present invention.

According to the above-mentioned embodiments, the quantization unit 406 performs the quantization processing on the multi-valued data on the plural planes in parallel (concurrently), the present invention is not limited to this, and the quantization processing may sequentially be performed on the multi-valued data on the plural planes. In a case where the quantization processing is sequentially performed on the first to third multi-valued data corresponding to the three planes, the quantization unit 406 of FIG. 4 performs the quantization processing in the order, for example, of the first scanning multi-valued data 502 functioning as the first multi-valued data, the second scanning multi-valued data 504 functioning as the second multi-valued data, and the first and second scanning common multi-valued data 503 functioning as the third multi-valued data. In this manner, in a case where the quantization processing is sequentially performed, as compared with the case of performing the quantization processing concurrently (in parallel), it is possible to reduce the use amount of the memory used at the time of performing the quantization processing. For example, in a case where the error diffusion processing is performed as the quantization processing, it is possible to reduce a use area of an error storage memory for storing the error values generated through the error diffusion processing.

According to the above-mentioned embodiments, the mode of using the ink of four colors of CMYK has been described, but the number of types for the usable ink colors is not limited to this. In addition to the above-mentioned four color ink, pale cyan (Lc) or pale magenta (Lm) ink may be added, or spot color ink such as red ink (R) or blue ink may be added. Also, according to the above-mentioned embodiments, the case has been described in which the color recording mode using the ink of the plural colors is executed, but the present invention can also be applied to a mono-color mode using single color ink. Furthermore, the present invention is not only applicable to a color printer but also a monochrome printer.

According to the above-mentioned embodiments, in the configuration where the image is recorded in the same area of the recording medium by performing the relative movement of the recording medium and the recording element group by plural times, the case of quantizing the multi-valued data corresponding commonly to the plural relative scannings has been described, but the present invention is not limited to this. That is, in a recording apparatus provided with a plurality of recording element groups (the recording head) for recording dots of the same color, by generating the quantized data where the multi-valued data corresponding commonly to the plurality of recording element groups is quantized, while suppressing the density variations in the same area recorded by the plurality of recording element groups, it is possible to hold the granularity to a low level.

In such a configuration, first, the multi-valued data (K2) after the gradation correction is divided into first recording element group multi-valued data corresponding only to the first recording element group, second recording element group multi-valued data corresponding only to the second recording element group, and first and second recording element group common multi-valued data corresponding commonly to the first recording element group and the second recording element group. Then, the quantization processing is performed on the first recording element group multi-valued data, the first and second recording element group common multi-valued data, and the second recording element group multi-valued data. Next, the first recording element group quantized data, the first and second recording element group common quantized data, and the second recording element group quantized data thus generated are input to a quantized data combination unit. Then, through the combination processing of the first recording element group quantized data the first and second recording element group common quantized data, first recording element group combined quantized data is generated, and through the combination processing of the second recording element group quantized data and the first and second recording element group common quantized data, second recording element group combined quantized data is generated.

Also, a configuration of quantizing the multi-valued data common to the plurality of recording element groups can also be utilized for a processing on a connection part of the recording apparatus using a connection head where a plurality of head chips are arranged while being shifted in the array direction of the recording elements. To elaborate, by quantizing the multi-valued data common to the plurality of recording element groups included in the two head chips for recording the connection part, while suppressing the density variations of the connection part, it is possible to hold the granularity to a low level.

According to the above-mentioned embodiments, the image processing apparatus which executes the image processing characteristic to the embodiment of the present invention has been described by exemplifying the recording apparatus (image forming apparatus) provided with the control unit 3000 having the image processing function, but the present invention is not limited to such a configuration. A configuration may also be adopted in which the characteristic image processing of the present invention is executed by a host computer in which a printer driver is installed (for example, the PC 3010 of FIG. 3). In such a case, the host apparatus connected to the recording apparatus is relevant to the image processing apparatus of the present invention.

Also, the present invention is also realized by executing the following processing. That is, software (program) that realizes the functions of the above-mentioned embodiments is supplied via a network or various storage medium to a system or an apparatus, and a computer of the system or the apparatus (or a CPU, an MPU, or the like) reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240870 filed Oct. 19, 2009, which is hereby incorporated by reference herein in its entirety.

What is claimed is:

1. An image processing apparatus for processing multi-valued image data corresponding to an image that is to be recorded in a pixel area of a recording medium to record the image in the pixel area by performing relative scannings, including at least first and second relative scannings, of a recording head and the recording medium, the image processing apparatus comprising:
a division unit configured to divide the multi-valued image data corresponding to the pixel area into first multi-valued data corresponding to the pixel area for the first relative scanning and not for the second relative scanning, second multi-valued data corresponding to the pixel area for the second relative scanning and not for the first relative scanning, and third multi-valued data corresponding to the pixel area for both of the first relative scanning and the second relative scanning;
a quantization unit configured to execute a quantization processing on each of the first, second, and third multi-valued data to generate first, second, and third quantized data, respectively, wherein each of the first, second and third quantized data indicates existence or non-existence of dots to be recorded in the pixel area; and
a generation unit configured to generate first print data corresponding to the pixel area used for the first relative scanning by performing logical sum processing on the first quantized data and the third quantized data, and generate second print data corresponding to the pixel area used for the second relative scanning by performing the logical sum processing on the second quantized data and the third quantized data.

2. The image processing apparatus according to claim 1, wherein the quantization unit executes a quantization processing based on an error diffusion method on each of the first, second, and third multi-valued data in a manner that locations of recording pixels decided on the basis of each of the first, second, and third quantized data are mutually exclusive.

3. The image processing apparatus according to claim 1, wherein the quantization unit executes a quantization processing based on an error diffusion method using different error distribution matrices on each of the first, second, and third multi-valued data.

4. The image processing apparatus according to claim 1, wherein the quantization unit executes a quantization processing based on an error diffusion method using different thresholds on each of the first, second, and third multi-valued data.

5. The image processing apparatus according to claim 1, wherein the quantization unit executes a quantization processing based on a dither method using different dither matrices on each of the first, second, and third multi-valued data.

6. An image processing apparatus for processing multi-valued image data corresponding to an image that is to be recorded in a pixel area of a recording medium to record the image in the pixel area by performing a relative scanning of first and second recording element groups and the recording medium, the image processing apparatus comprising:
  a division unit configured to divide the multi-valued image data corresponding to the pixel area into first multi-valued data corresponding to the pixel area for the first recording element group and not for the second recording element group, second multi-valued data corresponding to the pixel area for the second recording element group and not for the first recording element group, and third multi-valued data corresponding to the pixel area for both of the first recording element group and the second recording element group;
  a quantization unit configured to execute a quantization processing on each of the first, second, and third multi-valued data to generate first, second, and third quantized data, respectively, wherein each of the first, second and third quantized data indicates existence or non-existence of dots to be recorded in the pixel area; and
  a generation unit configured to generate first print data corresponding to the pixel area used for the first recording element group by performing logical sum processing on the first quantized data and the third quantized data and generate second print data corresponding to the pixel area used for the second recording element group by performing the logical sum processing on the second quantized data and the third quantized data.

7. An image processing method of processing multi-valued image data corresponding to an image that is to be recorded in a pixel area of a recording medium to record the image in the pixel area by performing relative scannings, including at least first and second relative scannings, of a recording head and the recording medium, the image processing method comprising:
  dividing the multi-valued image data corresponding to the pixel area into first multi-valued data corresponding to the pixel area for the first relative scanning and not for the second relative scanning, second multi-valued data corresponding to the pixel area for the second relative scanning and not for the first relative scanning, and third multi-valued data corresponding to the pixel area for both of the first relative scanning and the second relative scanning;
  executing a quantization processing on each of the first, second, and third multi-valued data to generate first, second, and third quantized data, respectively, wherein each of the first, second and third quantized data indicates existence or non-existence of dots to be recorded in the pixel area; and
  generating first print data corresponding to the pixel area used for the first relative scanning by performing logical sum processing on the first quantized data and the third quantized data and second print data corresponding to the pixel area used for the second relative scanning by performing the logical sum processing on the second quantized data and the third quantized data.

8. The image processing apparatus according to claim 1, wherein a sum of a value of the first multi-valued data, a value of the second multi-valued data, and a double value of the third multi-valued data is substantially equal to a value of the multi-valued image data.

9. The image processing apparatus according to claim 1, wherein a sum of a value of the first multi-valued data, a value of the second multi-valued data, and a double value of the third multi-valued data is larger than a value of the multi-valued image data.

10. The image processing apparatus according to claim 1, wherein a value of the first multi-valued data is substantially equal to a value of the second multi-valued data.

11. The image processing apparatus according to claim 1, wherein the quantization unit executes a binarization processing on each of the first, second, and third multi-valued data to generate first, second, and third quantized data, respectively.

12. The image processing apparatus according to claim 1, wherein the division unit determines each of a value of the first multi-valued data, a value of the second multi-valued data, and a value of the third multi-valued data according to a printing condition.

13. The image processing apparatus according to claim 12, wherein the division unit determines the value of the third multi-value data is a first value in a case that a value of the multi-valued image data is corresponding to a first image density, and determines the value of the third multi-valued data is a second value which is larger than the first value in a case that the value of the multi-valued image data is corresponding to a second image density which is higher than the first image density.

14. The image processing apparatus according to claim 1, further comprising a recording control unit configured to cause the recording head to record the image on the recording medium in the first relative scanning according to the first print data generated by the generation unit and eject ink in the second relative scanning according to the second print data generated by the generation unit.

15. The image processing apparatus according to claim 1, wherein the recording head is an ink ejection head which ejects ink in the first relative scanning and the second relative scanning.

16. The image processing apparatus according to claim 1, further comprising the recording head.

17. The image processing apparatus according to claim 1, wherein a plurality of the relative scannings further includes a third relative scanning,
  wherein the first and third multi-valued data are not for the third relative scanning,
  wherein the division unit further divides the multi-valued image data into fourth multi-valued data corresponding to the pixel area for both of the first and third relative scannings and not for the second relative scanning, and fifth multi-valued data corresponding to the pixel area for all of the first, second and third relative scannings,
  wherein the quantization unit further executes the quantization processing on each of the fourth and fifth multi-valued data to generate fourth and fifth quantized data, respectively,
  and wherein the generation unit generates the first print data corresponding to the pixel area based on the first, third, fourth and fifth quantized data.

18. The image processing apparatus according to claim 14,
wherein the second multi-valued data is not for the third relative scanning,
wherein the division unit further divides the multi-valued image data into sixth multi-valued data corresponding to the pixel area for the third relative scanning and not for both of the first and second relative scannings, and seventh multi-valued data corresponding to the pixel area for both of the second and third relative scannings and not for the first relative scanning,
wherein the quantization unit further executes the quantization processing on each of the sixth and seventh multi-valued data to generate sixth and seventh quantized data, respectively, and
wherein the generation unit generates the second print data corresponding to the pixel area based on the second, third, fifth and seventh quantized data, and generates third print data corresponding to the pixel area used for the third relative scanning based on the fourth, fifth, sixth and seventh quantized data.

19. An image processing method of processing multi-valued image data corresponding to an image that is to be recorded in a pixel area of a recording medium to record the image in the pixel area by performing a relative scanning of first and second recording element groups and the recording medium, the image processing method comprising:
dividing the multi-valued image data corresponding to the pixel area into first multi-valued data corresponding to the pixel area for the first recording element group and not for the second recording element group, second multi-valued data corresponding to the pixel area for the second recording element group and not for the first recording element group, and third multi-valued data corresponding the pixel area for both of the first recording element group and the second recording element group;
executing a quantization processing on each of the first, second, and third multi-valued data to generate first, second, and third quantized data, respectively, wherein each of the first, second and third quantized data indicates existence or non-existence of dots to be recorded in the pixel area; and
generating first print data corresponding to the pixel area used for the first recording element group by performing logical sum processing on the first quantized data and the third quantized data and second print data corresponding to the pixel area used for the second recording element group by performing the logical sum processing on the second quantized data and the third quantized data.

20. An image processing apparatus for processing multi-valued image data corresponding to an image that is to be recorded in a pixel area of a recording medium to record the image in the pixel area by performing relative scannings, including at least first and second relative scannings, of a recording head and the recording medium, the image processing apparatus comprising:
a division unit configured to divide the multi-valued image data corresponding to the pixel area into first multi-valued data corresponding to the pixel area for the first relative scanning and not for the second relative scanning, second multi-valued data corresponding to the pixel area for the second relative scanning and not for the first relative scanning, and third multi-valued data corresponding to the pixel area for both of the first relative scanning and the second relative scanning, wherein a sum of a value of the first multi-valued data, a value of the second multi-valued data, and a double value of the third multi-valued data is substantially equal to or larger than a value of the multi-valued image data;
a quantization unit configured to execute a quantization processing on each of the first, second, and third multi-valued data to generate first, second, and third quantized data, respectively; and
a generation unit configured to generate first print data corresponding to the pixel area used for the first relative scanning based on the first quantized data and the third quantized data, and generate second print data corresponding to the pixel area used for the second relative scanning based on the second quantized data and the third quantized data.

21. An image processing apparatus for processing multi-valued image data corresponding to an image that is to be recorded in a pixel area of a recording medium to record the image in the pixel area by performing a relative scanning of first and second recording element groups and the recording medium, the image processing apparatus comprising:
a division unit configured to divide the multi-valued image data corresponding to the pixel area into first multi-valued data corresponding to the pixel area for the first recording element group and not for the second recording element group, second multi-valued data corresponding to the pixel area for the second recording element group and not for the first recording element group, and third multi-valued data corresponding to the pixel area for both of the first recording element group and the second recording element group, wherein a sum of a value of the first multi-valued data, a value of the second multi-valued data, and a double value of the third multi-valued data is substantially equal to or larger than a value of the multi-valued image data;
a quantization unit configured to execute a quantization processing on each of the first, second, and third multi-valued data to generate first, second, and third quantized data, respectively; and
a generation unit configured to generate first print data corresponding to the pixel area used for the first recording element group based on the first quantized data and the third quantized data, and generate second print data corresponding to the pixel area used for the second recording element group based on the second quantized data and the third quantized data.

* * * * *